Nov. 10, 1931.   R. GERBER ET AL   1,831,789
REVERSE CLUTCH
Filed Feb. 24, 1927   3 Sheets-Sheet 1

Inventor
Ralph Gerber
Ensley J. Doncaster
William S. Ewart
By Harry Bowen Attorney Nov. 10, 1931.    R. GERBER ET AL    1,831,789
REVERSE CLUTCH
Filed Feb. 24, 1927    3 Sheets-Sheet 2
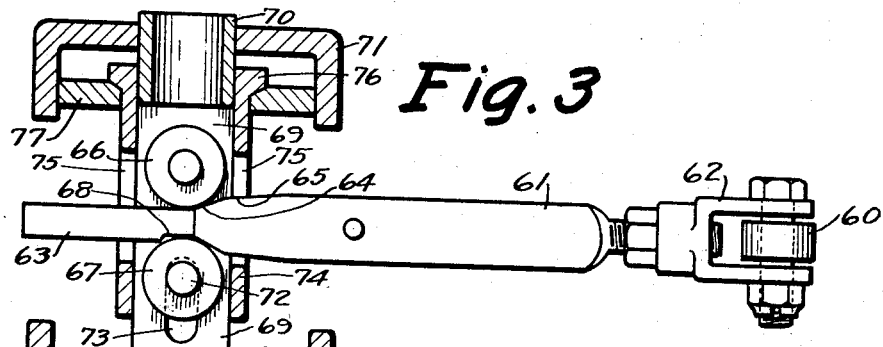
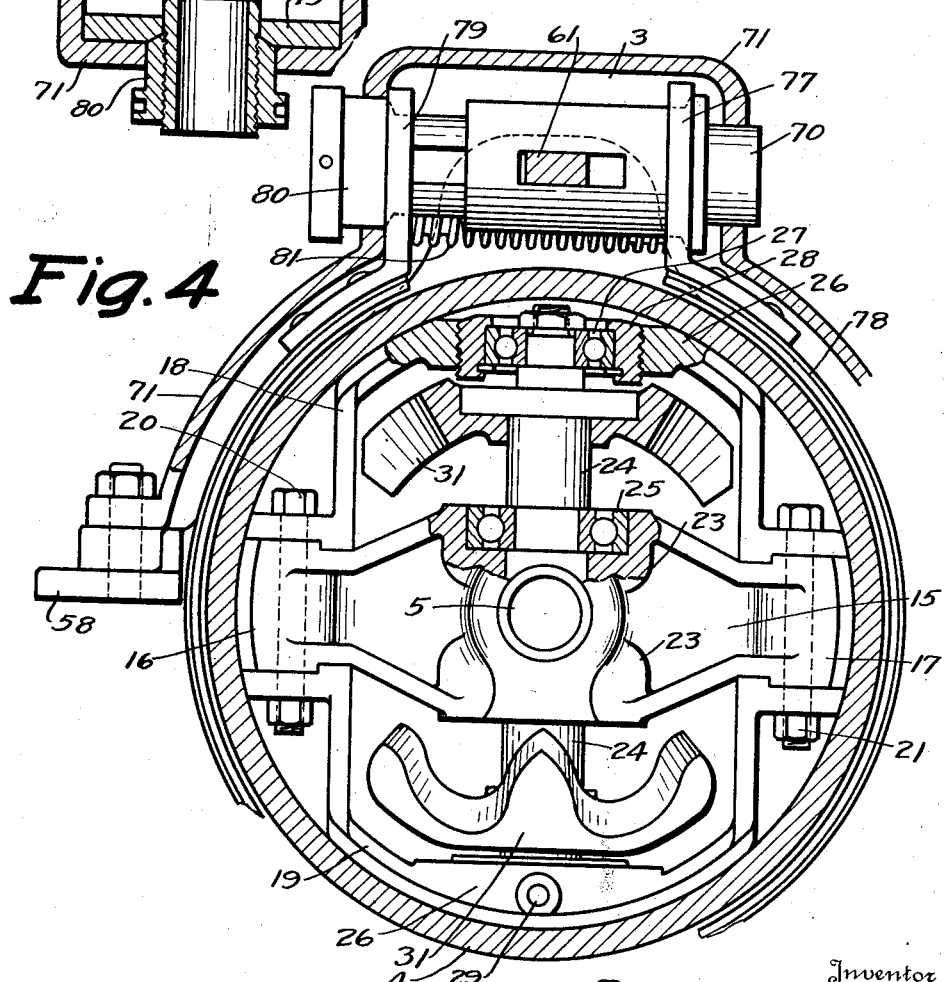
Inventor
Ralph Gerber
Ensley J. Doncaster
William S. Ewart
By Harry Bowen Attorney

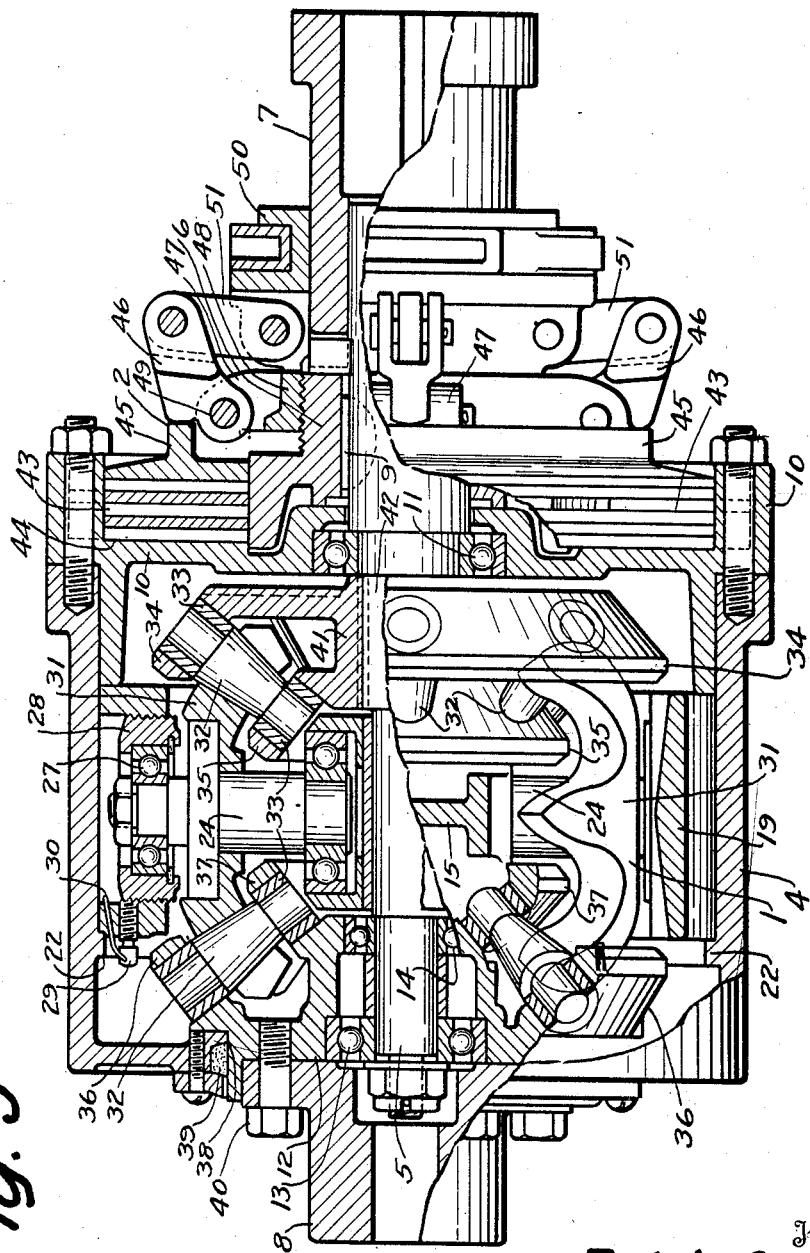

Patented Nov. 10, 1931

1,831,789

UNITED STATES PATENT OFFICE

RALPH GERBER, ENSLEY J. DONCASTER, AND WILLIAM E. EWART, OF RAYMOND, WASHINGTON, ASSIGNORS TO AMERICAN MANUFACTURING COMPANY, OF RAYMOND, WASHINGTON

REVERSE CLUTCH

Application filed February 24, 1927. Serial No. 170,563.

The invention is an improvement in reverse drive mechanisms embodying the combination of a clutch and a brake band operating through a drum shaped casing, having sprockets meshing with rollers in inclined flanges therein.

The object of the invention is to provide a reverse drive mechanism that will withstand a tremendous load shock and in which the wearing parts are reduced to a minimum.

Another object of the invention is to provide means for replacing the beveled gears of other similar devices which will be capable of standing a tremendous load shock.

Another object of the invention is to provide means for causing a reverse action which operates with a rolling contact instead of a sliding contact.

Another object of the invention is to provide means for mounting tapered rollers in inclined flanges in two abutting members with sprocket tooth members between them meshing with the rollers to provide the reverse action and also to operate as a solid unit to drive in the opposite direction.

A further object of the invention is to provide a clutch operating mechanism which operates in combination with a brake operating mechanism for operating a reverse drive mechanism.

A still further object of the invention is to provide a combination of rollers and sprockets for reversing the direction of a shaft in which all of the rotating parts are mounted on ball-bearings.

And a still further object of the invention is to provide a reverse drive mechanism having a clutch and brake co-operating therewith which are arranged so that the drive and driven shaft may rotate as a unit in the same direction, or so that the driven shaft may rotate in the opposite direction to that of the drive shaft and also so that the driven shaft may remain idle while the drive shaft is rotating.

With these ends in view the invention embodies a drum shaped casing having a drive shaft entering one end and a driven shaft attached to the opposite end. The drive shaft is arranged to drive the casing through a clutch at the end thereof and also to drive the driven shaft through rollers in inclined flanges co-operating with sprockets within the casing when the casing is held by a brake mechanism.

Other features and advantages of the invention will appear from the following description taken in connection with the drawings, wherein:

Figure 3 is a sectional plan through the brake operating mechanism on the top of the casing showing the brake operating lever.

Figure 4 is a cross section through the center of the casing.

Figure 5 is a longitudinal section through the casing and the upper part of the reverse drive mechanism with the lower part of the reverse drive mechanism broken away to show its operation.

Figure 1:
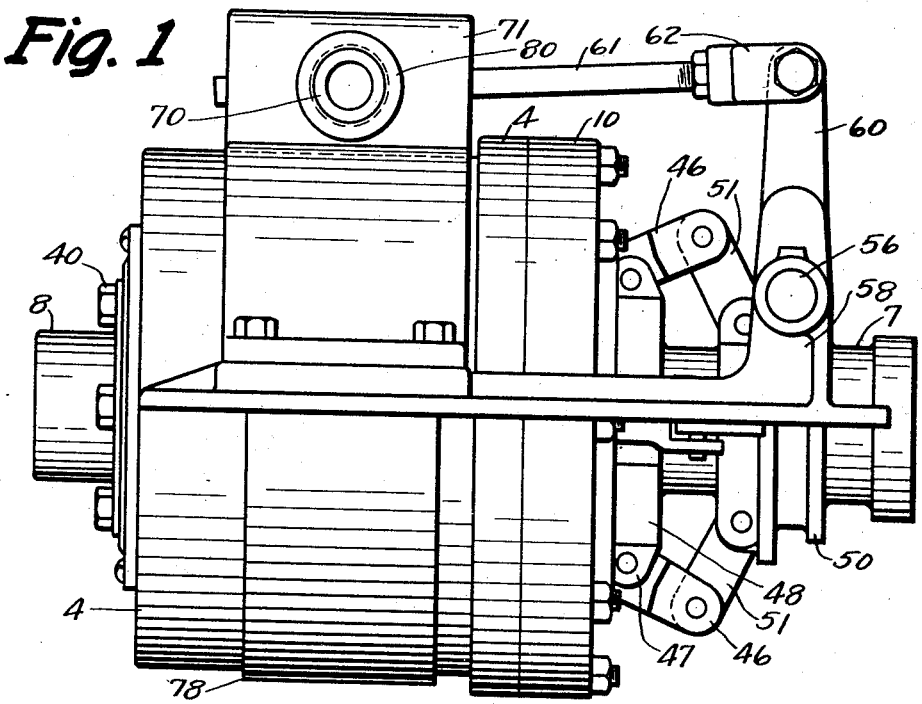
Figure 1 is a side elevation showing the exterior of the device.
Figure 2:
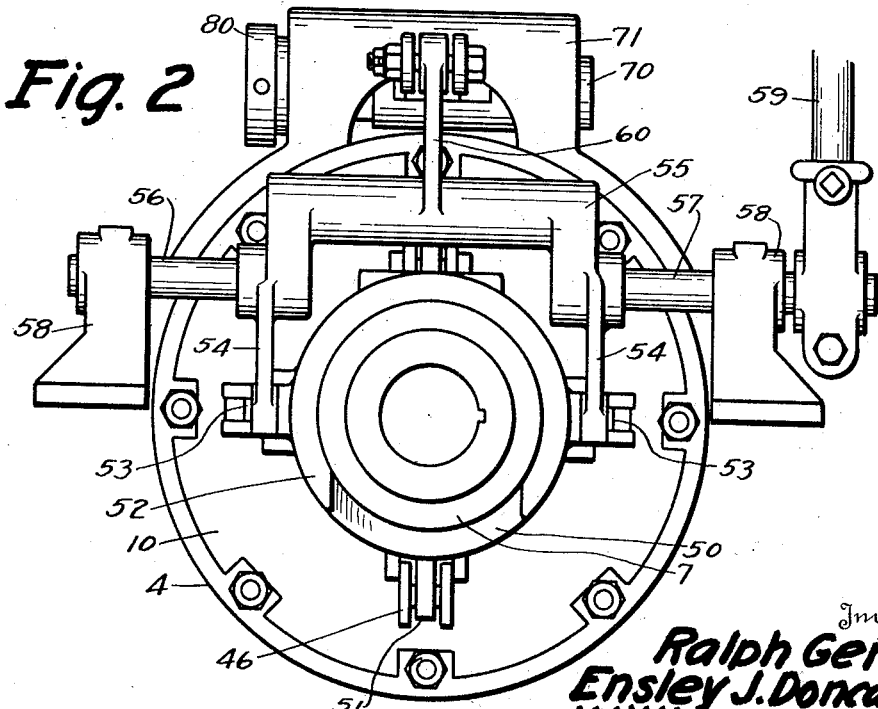
Figure 2 is an end view looking toward the clutch end of the casing.

In the drawings the device is shown as it would be made wherein numeral 1 indicates the reverse drive mechanism, numeral 2 the clutch mechanism and numeral 3 the brake mechanism.

The mechanism 1 is mounted in a drum shaped casing 4 having a shaft 5 in the center thereof and the shaft 5 is driven from a motor or engine driveshaft through a clutch hub 6 and a sleeve 7 which may be directly keyed to the drive shaft. A driven shaft may be rigidly attached to a hub 8 at the opposite end of the casing so that as the casing or the interior of the casing rotates the hub 8 will rotate the driven shaft.

The shaft 5 is made as shown in Figure 5 with one end extending into the sleeve 7 and the hub 6 mounted upon it and keyed to it by a key 9. This end of the shaft is rotatably mounted in a head 10 of the casing through a bearing 11 and the opposite end of the shaft is indirctly held in the casing through a hub 12 and bearings 13 and 14. The center of the shaft 5 is rotatably held in a cross member 15 having hubs 16 and 17 at the ends to which other members 18 and 19 are held by bolts 20 and 21. It will be observed that these members 15, 18 and 19 fit snugly in the casing 4 and are rigidly clamped therein by the head 10 which holds them against a shoulder 22, as shown in Figure 5. These members, and their arrangement are more clearly shown in Figure 4.

The member 15 is provided with hubs 23 at each side and small stub shafts 24 are rotatably mounted in these hubs in bearings 25. The upper ends of the stub shafts are rotatably mounted in hubs 26 in the members 18 and 19 through bearings 27 and adjusting nuts 28. It will be observed that any play developed in the bearings may be readily taken up by the adjusting nut 28 which is rigidly locked by a set screw 29, as shown in Figure 5. The set screw is held by a spring wire 30 as shown. Sprockets 31 are rigidly mounted on the stub shafts 24 and it will be observed that these sprockets mesh with tapered rollers 32 that are rotatably mounted in bushings 33 in inclined flanges 34 and 35 on one side, and 36 and 37 on the other. The flanges 36 and 37 extend outward from the hub 12 and the hub is provided with a recess 38 that forms a bearing in the end of the casing 4. A packing gland 39 may be placed in this bearing, as shown in Figure 5. The hub 12 is rigidly attached to the hub 8 by bolts 40. The flanges 34 and 35 extend outward from a hub 41 which is mounted upon the shaft 5 and keyed to it, as shown at the point 42 in Figure 5. It will be observed that the rollers 32 are rotatably mounted in the inclined flanges and as they engage the teeth of the sprocket 31 they will rotate and provide a rolling contact which will permit both them and the sprocket to withstand a tremendous shock load and wear indefinitely. This perfomance is greatly assisted by the double contact on both sides of the sprockets and roller flanges which provides a balanced load. This particular condition involving the heavy sprocket teeth forming a rolling contact with the heavy rollers which are positioned to receive a balanced load has a decided advantage over other similar devices as it makes it possible to instantly reverse the direction of the driven shaft without damaging the operating parts.

The clutch mechanism 2 is formed with a plurality of fibre and steel plates 43 mounted in a recess 44 in the casing head 10 and these plates are held by a member 45 that is forced against them by a lever 46. The lever 46 is pivotally mounted in projections 47 on a member 48 through pins 49. The lever 46 is operated by a sliding collar 50 through arms 51 and the collar 50 is operated by a yoke 52 which has pins 53 extending outward from it and the pins 53 are operated by downward extending arms 54 from a member 55 that is pivotally mounted on shafts 56 and 57 which are held in bearings 58. The shaft 57 may be rotated by a hand lever 59 which may be mounted on its outer end and this will in turn operate the clutch through the collar 50, the yoke 52 and the arms 54.

The brake mechanism 3 is also operated by the lever 59 through an arm 60 which extends upward from the member 55 and is pivotally attached to a bar 61 through a yoke 62, as shown in Figure 3. The opposite end 63 of the bar 61 is comparatively narrow and the bar is provided with inclined surfaces 64 and 65 between the end 63 and the main portion of the bar so that rollers 66 and 67 will be forced apart as the bar 61 is forced between them.

The end 63 is provided with a notch 68 which will form a stop for the bar with the device in the neutral position. The roller 66 is rotatably mounted in a slot 69 in a member 70 and the member 70 is slidably held in a frame 71 that forms a cover for the brake. The roller 67 is also mounted in the slot 69, however, the pin 72 of this roller extends through a slotted opening 73 in the member 70 and is pivotally mounted in a sleeve 74 that is slidable on the member 70 and provided with a slotted opening 75 through which the bar 61 passes. At one end of the member 74 is a flange 76 which will hold a clip 77 that is attached to one end of the brake band 78 and a clip 79 at the opposite end of the brake band 78 is held by a nut 80 on the opposite end of the member 70, as shown in Figure 3. It will be observed that as these rollers 66 and 67 are forced apart they will draw the clips 77 and 79 together and thereby cause the brake band 78 to grip the outer surface of the casing 4. These clips 77 and 79 are resiliently held apart by a spring 81, as shown in Figure 4. It is understood that any other resilient means may be used for holding these two members apart, and as many springs as may be desired may be used. It is also understood that any other suitable means may be used for operating the brake and also that the brake may be arranged in any suitable manner.

It will be understood that other changes may be used in the construction without departing from the spirit of the invention, one of which changes may be in the design, arrangement or operation of the clutch as it is understood that any suitable clutch may be used, another may be in the use of other types of bearings or in the general arrangement of the clutch casing and still another may be in the use of other means for mounting the tapered rollers or sprockets.

The construction will be readily understood from the foregoing description. In use, the device may be assembled as shown and described with the member 7 attached to the drive shaft and the member 8 to the driven shaft. It will be observed that the inner end of the member 7, which is slidable on the end of the shaft 5 is dove-tailed into the member 6 so that it is longitudinally slidable in relation thereto which provides means through which any wear that may develop in a thrust bearing may be compensated for. This slip coupling, or slidable connection will otherwise permit the two members to rotate as a unit and as the drive shaft rotates it will rotate the hub 6 which will cause the shaft 5 to rotate continuously. It will be observed that when the clutch 2 and brake 3 are free the interior of the device may rotate without rotating the casing or driven shaft, and when the clutch is thrown into engagement it will cause the entire casing to rotate as a unit which will in turn rotate the driven shaft with the drive shaft, whereas, when the clutch 2 is released and the brake 3 thrown into engagement it will instantly hold the casing and cause the driven shaft to rotate in the opposite direction to the drive shaft. It will be observed that this instantaneous reversing of the direction causes a tremendous shock load on the interior or operating parts of the device and the tapered rollers forming a rolling contact with the heavy toothed sprockets provide the only type of construction that will stand up under this load for any length of time. The differential arrangement is also an important factor as it provides an evenly distributed load.

Having thus fully described our invention what we claim as new and desire to secure by Letters Patent, is:

1. In a reverse mechanism of the class described, a connection for a driven shaft, a connection for a driven shaft to be located in axial alignment with the drive shaft, an intermediate shaft also in axial alignment with the said drive shaft, outwardly extending inclined flanges fixedly mounted on the said intermediate shaft, tapered rollers rotatably mounted between the said inclined flanges, other inclined flanges rotatably mounted on the said intermediate shaft and fixedly attached to the said driven shaft connection, tapered rollers rotatably mounted between the latter of the inclined flanges, a plurality of sprockets engaging both sets of the said tapered rollers, a drum shaped casing surrounding the said sprockets, rollers and flanges, means for rotatably supporting these devices in the said casing, a brake operable on the said casing, a clutch at one end of the said casing adaptable to hold the casing with its interior mechanism in fixed relation to the said drive shaft, a combined mechanism for operating the said brake and clutch and means for causing the said intermediate shaft to rotate with the said drive shaft.

2. In a reverse clutch of the class described, a drive shaft connection, a driven shaft connection, an intermediate shaft in axial alignment with the drive and driven shaft connections, a hub fixedly mounted on the said intermediate shaft, said hub being slidably connected to the said drive shaft connection, a drum rotatably mounted on the said shaft, a head in the said drum poistioned to co-operate with the said hub to form a clutch housing, a clutch in the said housing, a collar slidable on the said drive shaft connection and connected by levers to the said hub and clutch for operating the said clutch, a double flanged wheel fixedly mounted on the said intermediate shaft within the said drum, tapered rollers rotatably mounted between the said flanges, another double flanged wheel rotatably mounted on the said intermediate shaft within the said drum and rigidly connected to the said driven shaft connection, tapered rollers rotatably mounted between these flanges also, sprockets positioned to engage the rollers of both of the said wheels, radially extending spindles rotatably mounted in the said drum, said sprockets being mounted on the said spindles, a brake band extending around the said drum, a suitable frame into which the ends of the said brake band extend, a slotted shaft in the said frame, a roller rotatably mounted in the said slot, a sleeve slidable on the said shaft, another roller positioned in the said slot and journaled in the said sleeve, one of the ends of the said brake band being attached to the said sleeve and the other held to the said shaft by a nut, a rod with beveled edges extending between the rollers in the slot of the said shaft, an operating lever positioned adjacent the said brake and clutch mechanism and suitable connections between the said lever and mechanisms to operate either the brake or clutch or hold both in a free or neutral position.

In testimony whereof we affix our signatures.

RALPH GERBER.
ENSLEY J. DONCASTER.
WILLIAM E. EWART.